(12) United States Patent
Sgarz et al.

(10) Patent No.: US 9,784,557 B2
(45) Date of Patent: Oct. 10, 2017

(54) HAND TOOL DEVICE

(71) Applicant: Robert Bosch GmbH, Stuttgart (DE)

(72) Inventors: Heiko Sgarz, Leonberg (DE); Martin Pohlmann, Stuttgart (DE); Jan-Michael Brosi, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 561 days.

(21) Appl. No.: 14/364,045

(22) PCT Filed: Nov. 2, 2012

(86) PCT No.: PCT/EP2012/071713
§ 371 (c)(1),
(2) Date: Jun. 9, 2014

(87) PCT Pub. No.: WO2013/087291
PCT Pub. Date: Jun. 20, 2013

(65) Prior Publication Data
US 2014/0303928 A1     Oct. 9, 2014

(30) Foreign Application Priority Data

Dec. 13, 2011   (DE) .......................... 10 2011 088 438

(51) Int. Cl.
*G01B 7/30*     (2006.01)
*B25F 5/00*     (2006.01)
(Continued)

(52) U.S. Cl.
CPC .................. *G01B 7/30* (2013.01); *B25F 5/00* (2013.01); *G01B 7/004* (2013.01); *G01V 3/12* (2013.01)

(58) Field of Classification Search
CPC ....................................................... G01B 7/30
See application file for complete search history.

(56) References Cited

U.S. PATENT DOCUMENTS 5,457,394 A * 10/1995 McEwan ............... G01F 23/284
                                                    324/642
5,854,603 A * 12/1998 Heger ...................... G01S 7/03
                                                    342/21
(Continued)

FOREIGN PATENT DOCUMENTS

CN         1382314 A     11/2002
CN       101952740 A      1/2011
(Continued)

OTHER PUBLICATIONS

International Search Report corresponding to PCT Application No. PCT/EP2012/071713, mailed Dec. 12, 2012 (German and English language document) (7 pages).

*Primary Examiner* — Manuel L Barbee
*Assistant Examiner* — Raymond Nimox
(74) *Attorney, Agent, or Firm* — Maginot, Moore & Beck LLP (57) ABSTRACT

A hand tool device comprises a computing unit and at least one locating device configured to receive two orthogonal polarization directions of at least one reflected locating signal. The computing unit is configured to determine, from two received polarization directions of the reflected locating signal, an item of orientation information of a concealed, elongate object.

7 Claims, 6 Drawing Sheets (51) Int. Cl.
  *G01B 7/004* (2006.01)
  *G01V 3/12* (2006.01)

(56) References Cited

U.S. PATENT DOCUMENTS

| | | | |
|---|---|---|---|
| 6,211,662 B1 | 4/2001 | Bijawat et al. | |
| 2001/0007420 A1* | 7/2001 | Bijawat | G01V 3/15 324/67 |
| 2006/0238401 A1* | 10/2006 | Wuersch | G01V 3/15 342/22 |
| 2008/0231525 A1* | 9/2008 | Krapf | H01Q 21/26 343/720 |
| 2010/0328137 A1* | 12/2010 | Krapf | G01S 7/024 342/27 |
| 2011/0181483 A1* | 7/2011 | Krapf | H01Q 21/24 343/797 |
| 2013/0179123 A1* | 7/2013 | Krapf | G01D 3/08 702/187 |

FOREIGN PATENT DOCUMENTS

| | | |
|---|---|---|
| CN | 102197536 A | 9/2011 |
| DE | 10 2006 061 581 A1 | 7/2008 |
| DE | 10 2006 062 492 A1 | 7/2008 |
| DE | 10 2008 041 651 A1 | 3/2010 |
| EP | 1 717 606 A2 | 11/2006 |
| EP | 2 196 829 A2 | 6/2010 |
| JP | 61-90072 A | 5/1986 |
| WO | 94/27168 A1 | 11/1994 |

* cited by examiner

HAND TOOL DEVICE

This application is a 35 U.S.C. §371 National Stage Application of PCT/EP2012/071713, filed on Nov. 2, 2012, which claims the benefit of priority to Ser. No. DE 10 2011 088 438.6, filed on Dec. 13, 2011 Germany, the disclosures of which are incorporated herein by reference in their entirety.

BACKGROUND

A handheld tool apparatus having a computation unit and at least one locating apparatus that is provided for the purpose of at least receiving two orthogonal polarization directions for at least one reflected locating signal, has already been proposed.

SUMMARY

The disclosure is based on a handheld tool apparatus having a computation unit and at least one locating apparatus that is provided for the purpose of at least receiving two orthogonal polarization directions for at least one reflected locating signal.

It is proposed that the computation unit is provided for the purpose of determining a piece of orientation information for an elongate locatable object, particularly in a concealed arrangement, by means of the two received polarization directions of the reflected locating signal. A "computation unit" is intended to be understood to mean particularly a unit having an information input, an information processing section and an information output section. Preferably, the information input comprises at least one analog-to-digital converter that digitizes the component of the locating signal during operation. Advantageously, the computation unit has at least one processor, a memory, input and output means, further electrical parts, an operating program and/or at least one computation routine. Preferably, the parts of the computation unit are arranged on a common board and/or are advantageously arranged in a common housing. In particular, a "locating apparatus" is intended to be understood to mean an apparatus that transmits a locating signal during operation and receives a component of the locating signal that is reflected by the locatable object. Advantageously, the locating apparatus determines at least whether there is a locatable object in a locating range of the locating apparatus. With particular advantage, the locating apparatus determines at least one distance between the locating apparatus and the locatable object. Preferably, the locating antenna radiates a locating signal having a linear first polarization direction in the event of differential excitation of two opposite feed points. Advantageously, the locating antenna radiates a locating signal having a second linear polarization direction, which is orthogonal with respect to the first polarization direction, in the event of differential excitation of two other opposite feed points. Furthermore, a "locating signal" is intended to be understood to mean particularly a signal that the locating apparatus receives for the purpose of locating the locatable object. Preferably, the locating apparatus sends the locating signal for the purpose of locating the locatable object. Preferably, the locating signal has a bandwidth of more than 500 MHz, advantageously more than 1 GHz, particularly advantageously more than 2 GHz. Alternatively, the locating apparatus could send a narrowband locating signal, which allows an embodiment that is particularly simple in terms of design. In addition, "provided" is intended to be understood to mean particularly specifically programmed, designed and/or equipped. In particular, a polarization direction is intended to be understood to mean an orientation of an electrical vector for a field of the locating signal over a time profile. Preferably, the locating signal has linear polarization, that is to say particularly that a polarization direction for the electrical vector of the locating signal is constant. Alternatively, the locating signal can have circular polarization, that is to say particularly that a polarization direction for the electrical vector of the locating signal alters with a frequency of the locating signal. "Orthogonal polarization directions" are intended to be understood to mean particularly polarization directions that are independent of one another, specifically particularly polarization directions for a left-rotating and a right-rotating circular polarization and/or advantageously two polarization directions oriented at right angles to one another for two linear polarizations. The expression "receive two orthogonal polarization directions" is intended to be understood to mean particularly that the locating antenna is provided for the purpose of receiving two orthogonally polarized portions of the locating signal, and advantageously outputting them at at least two different feed points. Alternatively, the locating apparatus could have at least two locating antennas for receiving the polarization directions. Furthermore, a "locating signal" is intended to be understood to mean particularly a signal that the locating apparatus transmits for the purpose of locating the locatable object. Preferably, the locating signal has a bandwidth of more than 500 MHz, advantageously more than 1 GHz, particularly advantageously more than 2 GHz. In particular, a "reflected locating signal" is intended to be understood to mean a component of the locating signal that is reflected by the locatable object and received by the locating antenna. The term "received" is intended to be understood to mean particularly that the locating apparatus converts a portion of an energy of the locating signal reflected by the locatable object from an electromagnetic wave that is disseminated by an insulator and/or vacuum into a wave that is carried by an electrical conductor. In particular, a "piece of orientation information" is intended to be understood to mean a piece of information that describes an orientation for at least one main direction of extent of the locatable object at least in a locating range of the locating apparatus. Preferably, the orientation information is in the form of an angle between one of the polarization directions and the main direction of extent of the locatable object on a plane at right angles to the main radiation direction of the locating apparatus. A "main direction of extent" is intended to be understood to mean particularly a direction in which the locatable object has a maximum extent within the locating range on a plane at right angles to the main radiation direction. A "main radiation direction" for the locating apparatus is intended to be understood to mean particularly a direction in which the locating apparatus radiates a maximum power on average with the locating signal during operation. Preferably, the locating antenna radiates a locating signal at a maximum in the main radiation direction in the event of differential excitation of two opposite feed points. Preferably, the main radiation direction is oriented at right angles to an antenna element surface of the locating antenna of the locating apparatus. In particular, a "locating range" is intended to be understood to mean a range in which the locating apparatus transmits the locating signal and from which the locating apparatus receives the locating signal. Preferably, an antenna gain of the locating antenna varies by less than 20 dB, particularly preferably less than 10 dB, in the direction of the locating range. A "locatable object" is intended to be understood to mean particularly a part that is in a concealed arrangement in a workpiece, for example in a wall, and at least one electromagnetic property of which differs from that of the workpiece, for example a power line, a water conduit, a support and/or a piece of reinforcing ironwork. In particular, an "elongate locatable object" is intended to be understood to mean an object that, in the locating range at the level at right angles to the main radiation direction, has a ratio of greater than 2 to 1, advantageously greater than 3 to 1, particularly advantageously greater than 4 to 1, between the main extent and a maximum extent at right angles to the main extent. A "locatable object in a concealed arrangement" is intended to be understood to mean particularly an object that is arranged in a workpiece so as to be invisible to an operator. Preferably, the workpiece is in the form of a wall, a ceiling and/or in the form of another workpiece that appears useful to a person skilled in the art. In particular, the term "ascertain" is intended to be understood to mean that the computation unit calculates at least the orientation information for the locatable object from at least one characteristic quantity of the locating signal. The inventive embodiment of the handheld tool apparatus allows a profile of a locatable object to be established, particularly tracked, particularly conveniently. In particular, the operator can directly identify in which direction he needs to move the handheld tool apparatus in order to track the locatable object. Furthermore, the orientation information can be determined regardless of the depth of the locatable object.

In a further embodiment, it is proposed that the computation unit is provided for the purpose of determining the orientation information from at least one cross-polarization parameter, which allows the orientation information to be calculated in a manner that is simple in terms of design. "Cross-polarization parameter" is intended to be understood to mean particularly a scattering parameter, which describes at least one change, caused by the locatable object, in the polarization direction of the locating signal. Preferably, the computation unit determines the cross-polarization parameter by comparing the locating signal sent with the first polarization direction and a received reflection of the locating signal that has a second polarization direction, which is orthogonal with respect to the first polarization direction. A "scattering parameter" is intended to be understood to mean particularly a description of a reflection of the locating signal at the locatable object, which description comprises at least information about an amplitude and a phase angle of the reflected component of the locating signal. Preferably, the scattering parameter describes the difference between the sent locating signal and the reflected component of the locating signal, specifically particularly as a complex value. In particular, the computation unit determines a scattering parameter by comparing a sent locating signal and received components of the locating signal in complex fashion.

Furthermore, it is proposed that the computation unit is provided for the purpose of determining a total cross-polarization parameter from cross-polarization parameters for the two orthogonal polarization directions of the reflected locating signal, which allows advantageously simple calculation of the total cross-polarization parameter to be achieved. A "total cross-polarization parameter" is intended to be understood to mean particularly a scattering parameter that describes a change, caused by the locatable object, in the polarization direction of the locating signal in both polarization directions.

In addition, it is proposed that the computation unit is provided for the purpose of determining orientation information from at least one copolarization parameter for the reflected locating signal, which allows particularly advantageous calculation. In particular, a "copolarization parameter" is intended to be understood to mean a scattering parameter that describes at least one reflection at the locatable object without a change in the polarization direction. Preferably, the computation unit determines the copolarization parameter by comparing the locating signal sent with the polarization direction and a reflection of the locating signal, received with an identical polarization direction.

In addition, it is proposed that the computation unit is provided for the purpose of determining an angle-shifted total cross-polarization parameter from the copolarization parameters of the two polarization directions of the reflected locating signal. An "angle-shifted total cross-polarization parameter" is intended to be understood to mean particularly a total cross-polarization parameter that corresponds to a total cross-polarization parameter with an unshifted angle, in the case of which the handheld tool apparatus is rotated to an angle, preferably 45°, through a main radiation direction relative to the locatable object. Preferably, the computation unit calculates the angle-shifted total cross-polarization parameter. This embodiment allows simple and particularly accurate calculation of the orientation information.

In addition it is proposed that the computation unit is provided for the purpose of determining the orientation information from an absolute value for the total cross-polarization parameter and an absolute value for the angle-shifted total cross-polarization parameter, which means that tolerances can advantageously be compensated for. An "absolute value" is intended to be understood to mean particularly a maximum real value for the complex total cross-polarization parameter, that is to say particularly a length for the vector of the complex total cross-polarization parameter.

In a further embodiment, it is proposed that the computation unit is provided for the purpose of determining the orientation information by means of an angle function, particularly an arc tangent function, from the total cross-polarization parameter and the angle-shifted total cross-polarization parameter, which allows accurate calculation of the orientation information with little computation complexity and in a manner that is simple in terms of design.

Furthermore, it is proposed that the computation unit is provided for the purpose of at least reducing an ambiguity for the determination of the orientation information by means of at least one copolarization parameter, which allows advantageous and, in particular, explicit output of the orientation information with a simple calculation. "At least reduce ambiguity" is intended to be understood to mean particularly that a calculation of the orientation information has multiple solutions and the computation unit excludes at least one solution that is not relevant. Preferably, the computation unit excludes all solutions that are not relevant.

In addition, it is proposed that the handheld tool apparatus has at least one motion sensor that ascertains a piece of motion information that the computation unit uses in order to reduce an ambiguity for the determination of the orientation information in at least one operating state, which allows advantageous and, in particular, explicit output of the orientation information in a manner that is simple in terms of design. A "motion sensor" is intended to be understood to mean particularly a sensor that senses a movement by the handheld tool apparatus relative to the locatable object, particularly at right angles to a locating direction. The sensor is in the form of a sensor that appears useful to a person skilled in the art, but preferably in the form of an optical sensor, in the form of a tactile sensor and/or in the form of a sound sensor.

In addition, it is proposed that the locating apparatus is provided for the purpose of determining a piece of profile information for the elongate locatable object by means of locating operations in different lateral radiation directions, which means that it is possible to dispense with moving parts. In this context, "in different lateral radiation directions" is intended to be understood to mean particularly that the locating apparatus performs multiple locating operations in different locating directions. Preferably, the locating apparatus actuates the locating antenna in different ways, as a result of which the locating signal is transmitted in different locating directions. Alternatively, or in addition, the locating apparatus could move the locating antenna mechanically. A "piece of profile information" is intended to be understood to mean particularly a piece of information that indicates whether the locatable object extends in this direction.

In addition, it is proposed that the computation unit is provided for the purpose of at least reducing an ambiguity for the determination of the orientation information by means of the profile information, which allows advantageous and, in particular, explicit output of the orientation information with a simple calculation.

Furthermore, the disclosure is based on a handheld locating appliance having a handheld tool apparatus according to the disclosure. A "handheld locating appliance" is intended to be understood to mean particularly an appliance that is provided for the purpose of detecting elements that are in a concealed arrangement in a workpiece, for example power lines, water pipes and/or wooden beams, when guided along the workpiece by an operator using his hand, and advantageously ascertaining a position, particularly a distance from the appliance. Preferably, the handheld locating appliance has an appliance housing that is designed to be able to be gripped by an operator for the purpose of guidance.

Furthermore, the disclosure is based on a handheld tool having a handheld tool apparatus according to the disclosure, as a result of which it is a particularly simple matter for a workpiece to be checked for locatable objects before a work process. In particular, a "handheld tool" is intended to be understood to mean a tool that appears useful to a person skilled in the art, but advantageously an electric drill, a hammer drill, a sledgehammer, a saw, a plane, a screwdriver, a milling machine, a grinder, an angle grinder, a garden implement and/or a multifunction tool. Preferably, the handheld tool has an appliance housing that is designed to be able to be gripped by an operator for the purpose of guidance.

Further advantages will emerge from the description of the drawing that follows. The figures shows an exemplary embodiment of the disclosure. The figures, the description and the claims contain numerous features in combination. A person skilled in the art will expediently also consider the features individually and combine them into further useful combinations.

DETAILED DESCRIPTION

Figure 1:
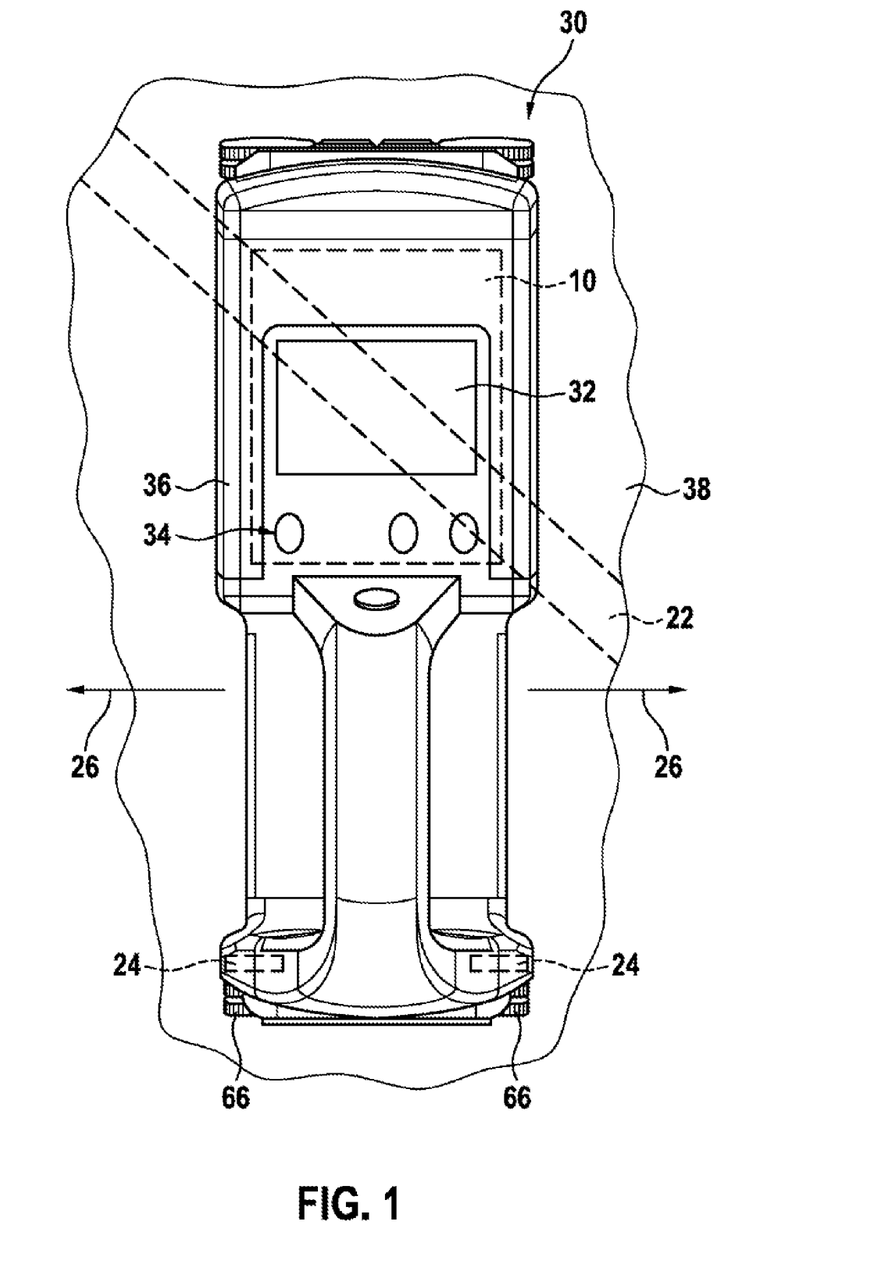
FIG. 1 shows a handheld locating appliance, having a handheld tool apparatus according to the disclosure, and a locatable object in a concealed arrangement in a workpiece.

FIG. 1 shows a handheld locating appliance 30 having a handheld tool apparatus 10, a display unit 32, an input unit 34 and an appliance housing 36. The operator guides the handheld locating appliance 30 over a workpiece 38 during operation using the appliance housing 36. In this case, the handheld tool apparatus sends a locating signal into the workpiece 38 through a side of the appliance housing 36 that is remote from the display unit 32. The workpiece 38 is in the form of part of a wall in this case. During a locating process, a locatable object 22 in a concealed arrangement in the workpiece 38 reflects a portion of the locating signal. The locatable object 22 shown is in the form of a water conduit running within the workpiece 38. It is therefore in the form of an elongate locatable object 22. The handheld tool apparatus 10 receives a portion of the locating signal and determines therefrom at least one piece of information about the locatable object 22. In this exemplary embodiment, the handheld tool apparatus 10 determines whether the locatable object 22 is arranged in a main radiation direction 40 in front of a locating antenna 42 of the locating apparatus 14, and a depth at which the locatable object 22 is arranged. If the locatable object 22 is in elongate form, the handheld tool apparatus 10 also determines a piece of orientation information 20 for the locatable object 22.

Figure 2:
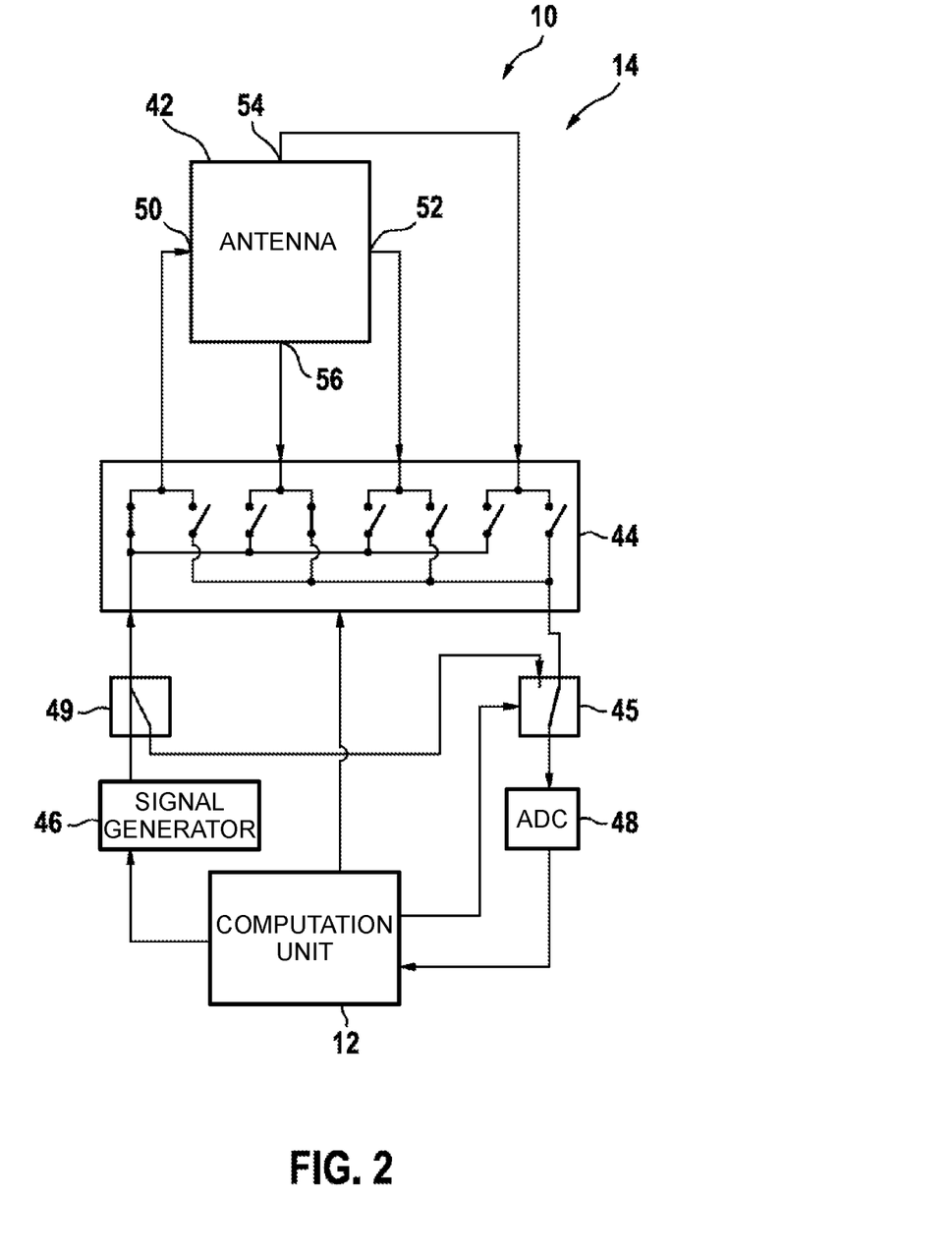
FIG. 2 shows a schematic illustration of the handheld tool apparatus having a computation unit and a locating apparatus from FIG. 1.

The handheld tool apparatus 10 shown in more detail in FIG. 2 comprises a computation unit 12 and a locating apparatus 14. The locating apparatus 14 has the locating antenna 42, a first antenna changeover switch 44, a second antenna changeover switch 45, a signal generator 46, a first analog-to-digital converter 48 and an antenna splitter 49. The signal generator 46 produces the locating signal. The locating signal has a bandwidth of 2 GHz and a center frequency of 3 GHz. The computation unit 12 controls the production of the locating signal. Alternatively or in addition, a signal generator could transmit a locating signal, in particular via an antenna changeover switch, to a computation unit that quantizes the unsent locating signal. The locating antenna 42 has four feed points 50, 52, 54, 56. The antenna splitter 49 is arranged between the signal generator 46 and one of the antenna changeover switches 44. It is in the form of a directional coupler. It forwards a locating signal coming from the signal generator 46 to the antenna changeover switch 44. Furthermore, it forwards a returning component of the locating signal, coming from the antenna changeover switch 44, in the direction of the analog-to-digital converter 48. The antenna changeover switch 44 forwards the locating signal to a single one of the feed points 50, 52, 54, 56 of the locating antenna 42. The computation unit 12 controls the antenna changeover switches 44, 45. Hence the locating apparatus 14 is provided for the purpose of exciting a single one of the feed points 50, 52, 54, 56. The antenna changeover switches 44, 45 successively route the locating signal to all feed points 50, 52, 54, 56. It is shown that the antenna changeover switch 44 forwards the locating signal to a first of the feed points 50. Filters, amplifiers, mixers and modulators of the locating apparatus 14 are not shown in more detail. Alternatively, a locating apparatus could have two receivers, particularly for two analog-to-digital converters. In this case, one receiver could receive a locating signal reflected to a fed feed point and one receiver could receive a locating signal reflected to an unfed feed point. This allows the second antenna changeover switch 45 to be dispensed with.

Figure 3:
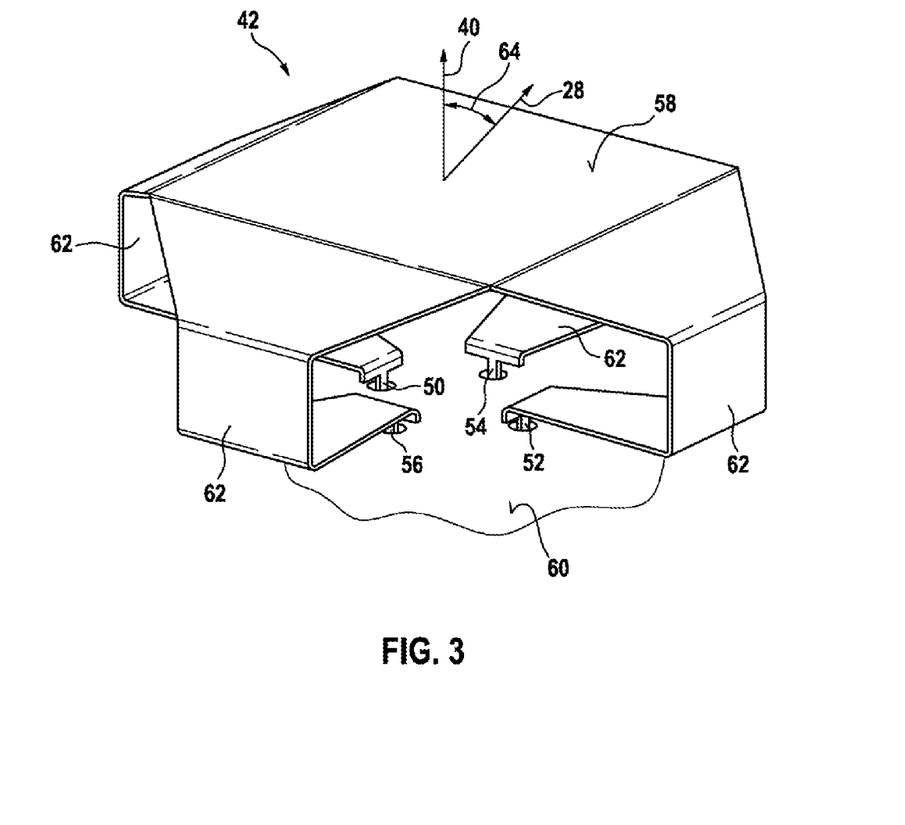
FIG. 3 shows a perspective illustration of a locating antenna of the locating apparatus from FIG. 2.

FIG. 3 shows the locating antenna 42 of the handheld tool apparatus 10. The locating antenna 42 is in the form of an LCR antenna. The locating antenna 42 comprises four feed points 50, 52, 54, 56, an antenna element surface 58, a ground plane 60 and four matching means 62. The ground plane 60 reflects a component of the locating signal that is sent in its direction by the antenna element surface 58 in the direction of the main radiation direction 40. During operation, the antenna element surface 58 sends and receives the locating signal in the main radiation direction 40. Said antenna element surface has a square shape. The feed points 50, 52, 54, 56 use the matching means 62 to excite the antenna element surface 58 to transmit the locating signal. In this case, the matching means 62 transform a characteristic impedance of the feed points 50, 52, 54, 56, in this case 50 ohms, to produce a characteristic impedance of the antenna element surface 58, which in this case is less than 10 ohms. The matching means 62 have a trapezoidal profile from the feed points 50, 52, 54, 56 to the antenna element surface 58. The antenna element surface 58 and the matching means 62 are formed by a conductive surface of integral design. In this case, the matching means 62 taper from the antenna element surface 58 in the direction of the feed points 50, 52, 54, 56. The feed points 50, 52, 54, 56 are arranged on a level that is defined by the ground plane 60. The ground plane 60 extends parallel to the antenna element surface 58 at the feed points 50, 52, 54, 56. A further embodiment of the locating antenna 42 can be found in the document DE 10 2008 041 651 A1, in particular.

When feeding one of the feed points 50, 52, 54, 56, the locating antenna 42 simultaneously sends two orthogonal polarization directions 16, 18 for the locating signal. Simultaneously, the locating antenna 42 receives a component of the locating signal that is reflected by the locatable object 22. At each of the four feed points 50, 52, 54, 56, the locating antenna 42 outputs a received portion of the reflected locating signal. Each portion of the reflected locating signal that is output by the feed points 50, 52, 54, 56 comprises both polarization directions 16, 18 of the locating signal in accordance with an antenna characteristic of the locating antenna 42. The four feed points 50, 52, 54, 56 of the locating antenna 42 are excited individually in succession. Whenever one of the feed points 50, 52, 54, 56 is excited, the antenna changeover switches 44, 45 forward the components of the locating signal that are received by the locating antenna 42 and output by the feed points 50, 52, 54, 56 to the analog-to-digital converter 48 in succession. To this end, a received component from the feed point 50 that is currently sending is decoupled via the antenna splitter 49 upstream of the signal generator 46. The analog-to-digital converter 48 successively quantizes the received portions of the locating signal that come from the four feed points 50, 52, 54, 56.

Figure 4:
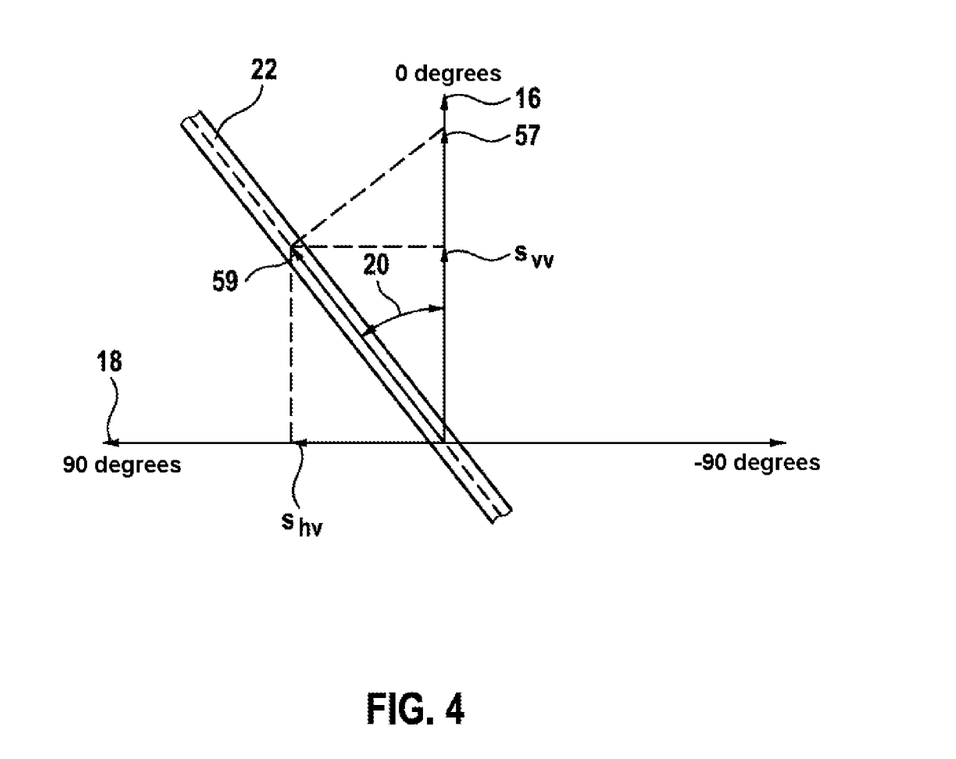
FIG. 4 shows a profile for a signal strength and a phase of a reflected, vertically sent locating signal on the basis of an angle between the handheld locating appliance and the locatable object from FIG. 1.
Figure 5:
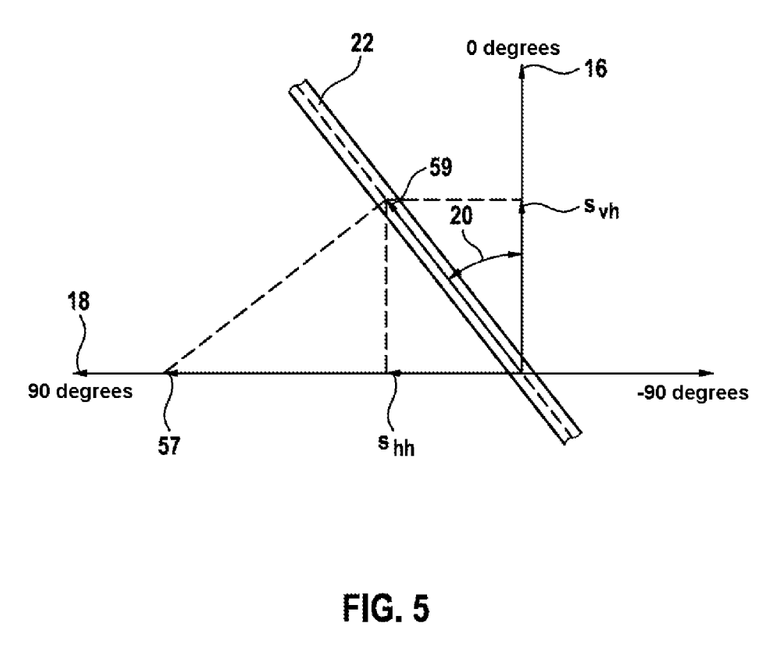
FIG. 5 shows a profile for a signal strength and a phase of a reflected horizontally sent locating signal on the basis of an angle between the handheld locating appliance and the locatable object from FIG. 1.

The computation unit 12 is provided for the purpose of determining a piece of orientation information 20 for the elongate locatable object 22 in a concealed arrangement by means of the two received polarization directions 16, 18 of the locating signal that are shown in FIG. 4 and FIG. 5, in particular. To this end, the computation unit 12 calculates a backscatter matrix for the locatable object 22 from the received portion of the locating signal on the basis of the sent locating signal 57. The backscatter matrix describes a reflection of an arbitrary polarized locating signal at the locatable object 22. By way of example, the computation unit 12 can calculate a circular scattering parameter $S_{circ}$ for a reflection of a circularly transmitted locating signal at the locatable object 22. In order to ascertain the orientation information 20, the computation unit 12 determines two cross-polarization parameters $S_{hv}$, $S_{vh}$ and two copolarization parameters $S_{vv}$, $S_{hh}$ for the locatable object 22. A first cross-polarization parameter $S_{hv}$ describes what component of a locating signal sent with the first polarization direction 18 is reflected by the locatable object 22 with the second polarization direction 18. A second of the cross-polarization parameters $S_{vh}$ describes what component of a locating signal sent with the second polarization direction 18 is reflected by the locatable object 22 with the first polarization direction 16. A first of the copolarization parameters $S_{vv}$ describes what component of a locating signal sent with the first polarization direction 16 is reflected by the locatable object 22 with the first polarization direction 16. A second of the copolarization parameters $S_{hh}$ describes what component of a locating signal sent with the second polarization direction 18 is reflected by the locatable object 22 with the second polarization direction 18. The polarization directions 16, 18 are in the form of linear polarization directions. The polarization directions 16, 18 are oriented orthogonally with respect to one another.

The computation unit 12 determines a total cross-polarization parameter $S_{xpol}$ from the cross-polarization parameters $S_{hv}$, $S_{vh}$ of the two orthogonal polarization directions 16, 18 of the reflected locating signal. To this end, the computation unit 12 adds the cross-polarization parameters $S_{hv}$, $S_{vh}$ in complex fashion. The total cross-polarization parameter $S_{xpol}$ describes crosstalk, caused by the reflection, from the two polarization directions 16, 18 to each of the other polarization directions 16, 18. The computation unit 12 is provided for the purpose of determining the orientation information 20 from the copolarization parameters $S_{vv}$, $S_{hh}$. To this end, the computation unit 12 determines an angle-shifted total cross-polarization parameter $S_{xpol45}$ from copolarization parameters $S_{vv}$, $S_{hh}$ for the two polarization directions 16, 18 of the reflecting locating signal. To this end, the computation unit 12 subtracts the second copolarization parameter $S_{vh}$ from the first copolarization parameter $S_{vv}$ in complex fashion. The computation unit 12 determines the orientation information Φ20 in a range of values between −90 degrees and 90 degrees using the following formula:

$$\Phi = \frac{1}{2}\arctan\left(\frac{|S_{xpol}|}{|S_{xpol45}|}\right)$$

The computation unit 12 therefore determines the orientation information 20 from an absolute value for the total cross-polarization parameter $S_{xpol}$. In addition, the computation unit 12 therefore determines the orientation information 20 from an absolute value for the angle-shifted total cross-polarization parameter $S_{xpol45}$. This makes it possible to avoid a complex value for the quotient $S_{xpol}/S_{xpol45}$ that is caused by measurement inaccuracies. The computation unit 12 determines the orientation information 20 by means of an angle function from the total cross-polarization parameter $S_{xpol}$ and the angle-shifted total cross-polarization parameter $S_{xpol45}$. The angle function is an arc tangent function.

As a result of the formation of the absolute value during the calculation of the orientation information 20, the orientation information 20 has a fourfold ambiguity. In order to reduce the ambiguities, a phase of the total cross-polarization parameter $S_{xpol}$ and of the angle-shifted total cross-polarization parameter $S_{xpol45}$ is first of all compared. If the total cross-polarization parameter $S_{xpol}$ and the angle-shifted total cross-polarization parameter $S_{xpol45}$ have an identical phase, a value of the orientation information 20 lies in a range of values between −90 degrees and −45 degrees or 0 degrees and 45 degrees. If the total cross-polarization parameter $S_{xpol}$ and the angle-shifted total cross-polarization parameter $S_{xpol45}$ have a phase difference of 180 degrees, a value of the orientation information 20 lies in a range of values between −45 degrees and −0 degrees or 45 degrees and 90 degrees.

Figure 6:
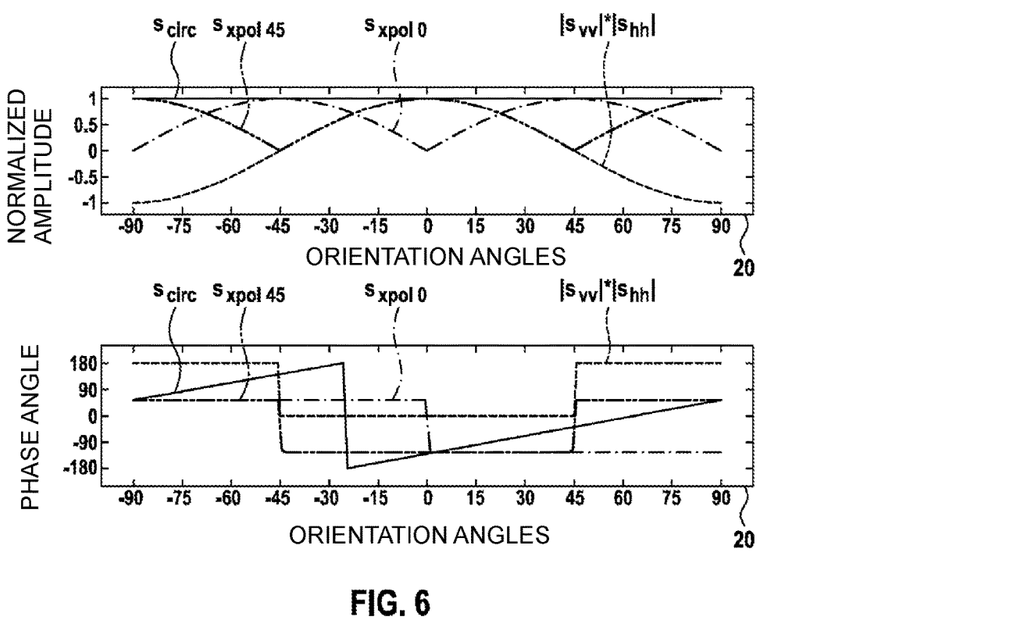
FIG. 6 shows a normalized profile for a value and a phase of scattering parameters ascertained from the locating signal.

In order to resolve a remaining ambiguity in the orientation information 20, the handheld tool apparatus 10 has four mechanisms. Alternatively a handheld tool apparatus 10 could have one, two or three of the mechanisms. The top of FIG. 6 shows a normalized profile for a value and the bottom of the figure shows a phase for the scattering parameters ascertained from the received locating signal 59.

1st Mechanism

The computation unit 12 resolves the ambiguity in the determination of the orientation information 20 by means of the copolarization parameters $S_{vv}$, $S_{hh}$. First of all, the computation unit 12 deducts a symmetry parameter $S_{sym}$ from the copolarization parameters $S_{vv}$, $S_{hh}$. The symmetry parameter $S_{sym}$ describes a component of the locating signal that is reflected by symmetrical objects, for example a surface of the workpiece 38. The symmetry parameter $S_{sym}$ is determined by the computation unit 12 by means of a measurement at a location on the workpiece 38 without an elongate locatable object, by means of determination of a mean reflection at various locations on the workpiece 38, by means of cross-correlation of the first copolarization parameter $S_{vv}$ and the second copolarization parameter $S_{hh}$ and/or by means of synthetic background determination by determining a dielectric constant for the workpiece 38. In this case, a measurement error during determination of the symmetry parameter $S_{sym}$ must be no more than half the magnitude of a calculated circular scattering parameter $S_{circ}$ for a reflection of a circularly polarized locating signal at the locatable object 22.

The computation unit 12 compares an absolute value of the first copolarization parameter $S_{vv}$, with an absolute value of the second copolarization parameter $S_{hh}$. If the first copolarization parameter $S_{vv}$, is greater than the second copolarization parameter $S_{hh}$, a value of the orientation information 20 lies in a range between −45 and 45 degrees. If the first copolarization parameter $S_{vv}$ is less than the second copolarization parameter $S_{hh}$, a value of the orientation information 20 lies in a range between −90 and −45 degrees or 45 degrees and 90 degrees.

2nd Mechanism

Furthermore, the computation unit 12 resolves the ambiguity by determining an angle factor $\sigma C$ on the basis of the copolarization parameters $S_{vv}$, $S_{hh}$ and the symmetry parameter $S_{sym}$:

$$\sigma C = S_{vv} + S_{hh} - 2 S_{sym}$$

Furthermore, the computation unit 12 determines an estimated angle factor $\sigma C_{estimated}$ from an estimated piece of orientation information $\Phi_{estimated}$. In this exemplary embodiment, the estimated orientation information $\Phi_{estimated}$ is estimated for one of the ambiguities in the range from −45 degrees to 45 degrees.

$$\sigma C_{estimated} = \frac{S_{xpol}}{\sin(2\Phi_{estimated})} = \frac{S_{xpol45}}{\cos(2\Phi_{estimated})}$$

In this case, the expression "with a denominator with a greater absolute value" is used. If the angle factor $\sigma C$ and the estimated angle factor $\sigma C_{estimated}$ have an identical phase, $\Phi$ has been estimated correctly. If the phase of the angle factor $\sigma C$ and of the estimated angle factor $\sigma C_{estimated}$ differ, $\Phi$ has been estimated incorrectly. In this case, the orientation information is in a range from −90 degrees to −45 degrees or in the range from 45 degrees to 90 degrees.

3rd Mechanism

The handheld tool apparatus 10 has a motion sensor 24. The motion sensor 24 is in the form of a rotation sensor connected to rollers 66. The motion sensor 24 ascertains at least one piece of motion information 26 for the handheld tool apparatus 10 relative to the workpiece 38. In this case, the motion sensor 24 determines a piece of motion information 26 in the −90 degrees direction and in the 90 degrees direction. Furthermore, a motion sensor could sense a movement in the 0 degrees direction. If a calculated circular scattering parameter $S_{circ}$ remains essentially constant for movement in the −90 degrees or 90 degrees direction, the orientation information 20 is approximately −90 degrees or 90 degrees. If the calculated circular scattering parameter $S_{circ}$ alters during the movement, the operator is asked by means of the display unit 32 to turn the handheld locating apparatus 30 through an eighth of a revolution and to move the handheld locating apparatus 30 again.

4th Mechanism

As FIG. 3 shows, the locating antenna 42 radiates the locating signal in a lateral radiation direction 28 that differs from the main radiation direction 40 when the locating antenna 42 is excited via a single one of the feed points 50, 52, 54, 56. An angle 64 between the main radiation direction 40 and the lateral radiation direction 28 is approximately 40 degrees. FIG. 3 shows a lateral radiation direction 28 in the case of excitation of the first feed point 50. A locatable object 22 arranged in the lateral radiation direction reflects the locating signal excited via the relevant feed point 50 to a greater degree than a locatable object 22 arranged in the main radiation direction 40. Hence, the locating apparatus 14 is provided for the purpose of determining a piece of profile information for the elongate locatable object 22 by means of locating operations in different lateral radiation directions 28. The computation unit 12 reduces an ambiguity in the determination of the orientation information 20 by means of the profile information.

The invention claimed is:

1. A handheld tool apparatus, comprising:
an antenna including a plurality of inputs;
a plurality of switches operatively connected to the plurality of inputs;
a signal generator operatively connected to the plurality of switches, the signal generator being configured to generate an output signal, wherein the output signal is provided to at least one of the inputs to enable the antenna to transmit the output signal, wherein the antenna transmits the output signal including a component with a first polarization direction and another component with a second polarization direction simultaneously, the first polarization direction being orthogonal to the second polarization direction;
a receiver operatively connected to the antenna via the plurality of switches, wherein the antenna receives a reflected signal from an elongated locatable object embedded within a medium in response to the transmitted output signal, the reflected signal including components corresponding to the first polarization direction and the second polarization direction; and
a computation unit operatively connected to the plurality of switches, the signal generator, and the receiver, the computation unit being configured to:
operate the plurality of switches to connect the signal generator to at least one input in the plurality of inputs in the antenna to transmit the output signal;
operate the receiver and the plurality of switches to detect the reflected signal from the elongated locatable object in response to the transmitted signal using at least a first input and a second input in the plurality of inputs in the antenna;
identify a first cross-polarization parameter and a first co-polarization parameter based on a component of the reflected signal with the first polarization direction;
identify a second cross-polarization parameter and a second co-polarization parameter based on another component of the reflected signal with the second polarization direction;
determine a piece of orientation information for the elongated locatable object based on the first cross-polarization parameter, the second cross-polarization parameter, the first co-polarization parameter, and the second co-polarization parameter; and
generate an output indicating the orientation of the elongated locatable object based on the piece of orientation information.

2. The handheld tool apparatus as claimed in claim 1, wherein the computation unit is configured to:
determine a total cross-polarization parameter based on a complex valued sum of the first cross-polarization parameter and the second cross-polarization parameter; and
determine the piece of orientation information for the elongated locatable object based on the total cross-polarization parameter.

3. The handheld tool apparatus as claimed in claim 2, wherein the computation unit is configured to determine an angle-shifted total cross-polarization parameter based on the first co-polarization parameter and the second co-polarization parameter; and
determine the piece of orientation information for the elongated locatable object based on the total cross-polarization parameter.

4. The handheld tool apparatus as claimed in claim 3, wherein the computation unit is configured to determine the piece of orientation information from an absolute value of the total cross-polarization parameter and an absolute value of the angle-shifted total cross-polarization parameter.

5. The handheld tool apparatus as claimed in claim 4, wherein the computation unit is configured to determine the piece of orientation information with an angle function that incorporates the total cross-polarization parameter and the angle-shifted total cross-polarization parameter.

6. The handheld tool apparatus as claimed in claim 1, the computation unit being further configured to:

receive a first plurality of reflected signals having a first polarity with the receiver connected to the first input of the antenna from the medium that contains the elongated locatable object in a region of the medium where none of the plurality of reflected signals are reflected from the elongated locatable object;
receive a second plurality of reflected signals having a second polarity with the receiver connected to the second input of the antenna from the medium that contains the elongated locatable object in the region of the medium where none of the plurality of reflected signals are reflected from the elongated locatable object;
identify a symmetry parameter as a mean value of the first plurality of reflected signals and the second plurality of reflected signals; and
identify the orientation of the elongated locatable object in a first predetermined range of angles in response to an absolute value of a third co-polarization parameter corresponding to a difference between the first co-polarization parameter and the symmetry parameter being greater than an absolute value of a fourth co-polarization parameter corresponding to a difference between the second co-polarization parameter and the symmetry parameter; and
identify the orientation of the elongated locatable object in a second predetermined range of angles in response to the absolute value of the third co-polarization parameter being less than the absolute value of the fourth co-polarization parameter.

7. The handheld tool apparatus as claimed in claim 1, further comprising:
a rotational motion sensor configured to generate a signal corresponding to rotational movement of the handheld tool apparatus; and
the computation unit being operatively connected to the rotational motion sensor and further configured to:
identify a first rotational position for the handheld tool apparatus during the reception of the reflected signal, wherein the first co-polarization parameter, the first cross-polarization parameter, the second co-polarization parameter, and the second cross-polarization parameter are identified when the handheld tool apparatus is in the first rotational position;
identify a rotation to a 90° or −90° angle for the handheld tool apparatus in a second rotational position in a plane parallel to the elongated locatable object using the rotational motion sensor;
receive the reflected signal while the handheld tool apparatus is in the second rotational position;
identify a third co-polarization parameter and a third cross-polarization parameter in the reflected signal when the handheld tool apparatus is in the second rotational position, and a fourth co-polarization parameter and a fourth cross-polarization parameter in the reflected signal when the handheld tool apparatus is in the second rotational position;
identify the orientation of the elongated locatable object as being along the 90° or −90° angle in response to the first cross-polarization parameter matching the third cross-polarization parameter, the second cross-polarization parameter matching the fourth cross-polarization parameter, the first co-polarization parameter matching the third co-polarization parameter, and the second co-polarization parameter matching the fourth co-polarization parameter.

* * * * *